UNITED STATES PATENT OFFICE.

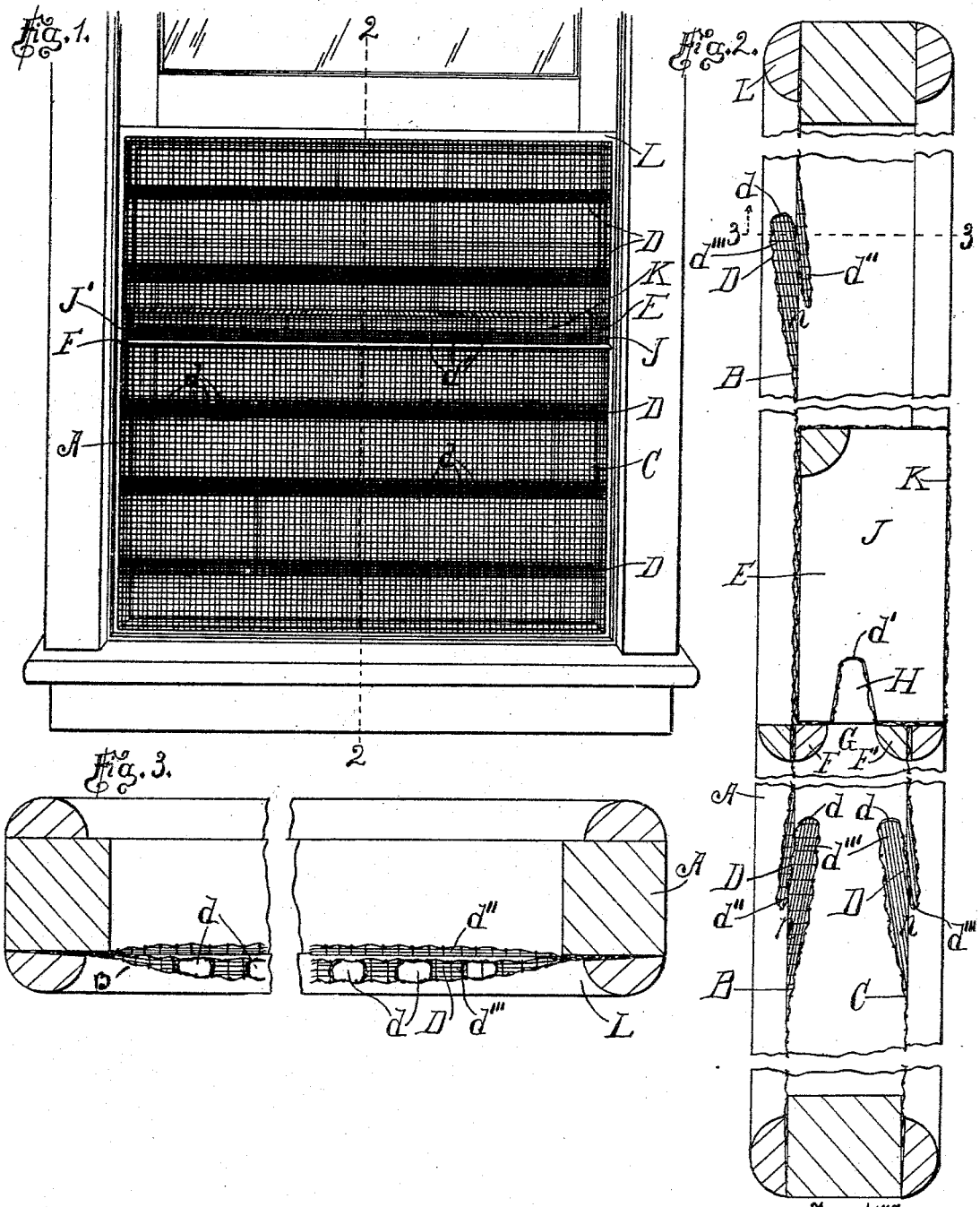

REUBEN J. TARBELL AND ROBERT S. A. TARBELL, OF LOS ANGELES, CALIFORNIA.

INSECT SCREEN AND TRAP.

SPECIFICATION forming part of Letters Patent No. 515,561, dated February 27, 1894.

Application filed July 31, 1893. Serial No. 481,928. (No model.)

*To all whom it may concern:*

Be it known that we, REUBEN J. TARBELL and ROBERT S. A. TARBELL, citizens of the United States, residing at Los Angeles, in the county of Los Angeles and State of California, have invented a new and useful Insect Screen and Trap, of which the following is a specification.

The object of our invention is to provide a cheap, simple, and ornamental device for entrapping flies, mosquitoes, moths, roaches and other insects and which is also adapted for use as an ornamental window or door screen.

The accompanying drawings illustrate our invention.

Figure 1 is a perspective view of one form of our window screen and fly trap in place in a window—looking from the inside of the room. Fig. 2 is a vertical midsection of the same on line 2—2 Fig. 1. Fig. 3 is a sectional fragmental detail looking up on line 3—3 Fig. 2.

A is the frame of the trap, and B and C are the two wire netting walls arranged therein with a space between them and respectively folded in one or more double reverse (S shaped) folds D, and having the wires of the netting at one bend of the respective folds arranged to leave insect ingress openings $d\ d$ large enough to allow the insect to be trapped to pass therethrough.

F F' are cross bars arranged at the upper end of the inner screen wall to support the cage. A slot G is arranged between them to register with the mouth of a fold H in the wire gauze bottom of the cage. The upper end of such fold is provided with the insect admitting openings $d'$. One end J of the cage is adapted to be opened to allow the removal of the insects after they have been caught.

In practice, the frame is set in the open window beneath the sash and the insects within the room passing along the screen enter the mouths of the folds in the wire gauze and pass through the openings $d$ and thus into the trap; while those insects on the outside attempting to enter will pass in the same way through the openings from the outside into the trap; and passing up within the trap, their way is unobstructed until they have entered the cage where they will remain until the cage is withdrawn. The cage is removable and when withdrawn can be put into hot water to destroy the insects or the insects may be destroyed in any other way. The insects which light upon the screen above the cage will be directed to pass to the outside of the house.

By placing our improved trap in an open window at night and stationing a brilliant light inside the room from which the window opens, the night insects such as moths, millers, &c., will be attracted to the screen and climbing up along the same will enter the cage. Mosquitoes can also be entrapped in this way and destroyed. The wire gauze is preferably secured to the rails of the frame by finishing beads L but it may be secured to the frame by any desired means.

In manufacturing our improved trap and screen, we fold the wire netting crosswise allowing the lap or fold to extend from side to side of the sheet of netting to be used for the screen. One of the folds $d''$ is drawn together close enough to prevent the entrance thereinto of the insects trapped, while the members of the other fold $d'''$ are sufficiently wide apart to allow the insects to pass into the space therebetween, and the openings $d$ or $d'$ are made in the bend at the end of the fold by means of an awl of a diameter equal to or slightly greater than the diameter of the insect to be trapped and such holes are punched at close intervals as indicated in Fig. 1 so that the insect will readily pass through the bend and find itself upon the other side of the screen. The construction of these folds is an essential part of our invention for the reason that it enables us to make a trap at much less expense than has heretofore been possible.

In applying the screens or wire netting wall to the frame, the folds should be arranged with the open mouth $n$ downward and the bend of the fold provided with the opening $d$ should be at the top of the fold for the reason that most insects after they have lighted upon the screen will crawl upward and if the folds were inverted reverse of that shown in the drawings, such insect would not enter the fold but would pass over it.

The cage E consists of a box K of wire netting, having its under side provided with the inwardly and upwardly projecting fold H having a series of openings $d'$ provided in the top of such fold. This cage may be provided with any suitable means whereby access will be given to the interior of the trap; for instance one of the end pieces J or J' may be detachably secured to the cage by any well known mechanical arrangement, but such contrivance does not constitute any part of our invention and therefore detailed illustration thereof is not given herein, it not being deemed necessary to a complete understanding of our invention.

Now, having described our invention, what we claim as new, and desire to secure by Letters Patent, is—

1. An insect trap comprising the frame; the wire netting walls arranged therein with the space between them and respectively folded in one or more double reverse folds and having the wires of the netting at one bend of the respective folds arranged to leave ingress openings to allow the ingress of the insect; into the space between the walls and provided at the top with the cage having its bottom provided with an upwardly projecting loop provided in its top with a series of openings communicating with the space between the wire netting walls.

2. An insect trap comprising the frame; a wire netting wall having one or more reverse folds and having the wires of the netting at one bend of the respective folds arranged to provide insect openings, such wall being arranged across the lower portion of the frame but not extending to the top thereof; the removable cage arranged above the top of such wall and provided on its under side with the upwardly projecting loop having the insect admitting openings and the wire netting wall arranged on the opposite side of such frame and extending from end to end thereof and provided below the cage with the double reverse folds provided with openings at the bend of the fold which opens into the space between such wall and the other wall, and having a fold or folds above such cage provided with openings and arranged opening in the direction opposite to the folds below such cage.

REUBEN J. TARBELL.
R. S. A. TARBELL.

Witnesses:
 JAMES R. TOWNSEND,
 F. M. TOWNSEND.